US008648279B2

(12) United States Patent
Takahashi et al.

(10) Patent No.: US 8,648,279 B2
(45) Date of Patent: Feb. 11, 2014

(54) PROCESS CONTROL APPARATUS AND LASER PROCESSING APPARATUS

(75) Inventors: Keiji Takahashi, Chiyoda-ku (JP); Tomonori Mukae, Chiyoda-ku (JP); Shigeru Yokoi, Chiyoda-ku (JP); Tatsuya Yamamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 12/936,120

(22) PCT Filed: Apr. 3, 2009

(86) PCT No.: PCT/JP2009/001575
§ 371 (c)(1),
(2), (4) Date: Oct. 1, 2010

(87) PCT Pub. No.: WO2009/122758
PCT Pub. Date: Oct. 8, 2009

(65) Prior Publication Data
US 2011/0042360 A1 Feb. 24, 2011

(30) Foreign Application Priority Data
Apr. 4, 2008 (JP) ................................ 2008-098524

(51) Int. Cl.
*B23K 26/04* (2006.01)
(52) U.S. Cl.
USPC ............. 219/121.75; 219/121.62; 219/121.83
(58) Field of Classification Search
USPC ............. 219/121.62, 121.83, 121.73, 121.75; 359/820; 700/166
See application file for complete search history.

(56) References Cited

U.S. PATENT DOCUMENTS

| 6,787,734 B2 * | 9/2004 | Liu ............................ 219/121.7 |
| 7,257,136 B2 | 8/2007 | Mori et al. |
| 2006/0060571 A1 | 3/2006 | Mori et al. |

FOREIGN PATENT DOCUMENTS

| CN | 1751836 A | 3/2006 |
| DE | 4333801 A1 | 4/1995 |
| DE | 102007039878 A1 | 5/2008 |
| EP | 1637272 A1 | 3/2006 |
| EP | 1716962 A1 | 11/2006 |
| GB | 2354845 A * | 4/2001 |
| JP | 63093491 A | 4/1988 |
| JP | 63093492 A | 4/1988 |
| JP | 11-202110 A | 7/1999 |
| JP | 2000-094173 A | 4/2000 |

OTHER PUBLICATIONS

Machine translation of German Patent document DE 4,333,801-A1,Jun. 2013.*
Chinese Office Action, "State Intellectual Property Office of P.R.C.", Mar. 5, 2013; Chinese Patent Application No. 200980112362.7.

* cited by examiner

*Primary Examiner* — Geoffrey S Evans
(74) *Attorney, Agent, or Firm* — Sughrue Mion, PLLC (57) ABSTRACT

A process control apparatus controls a focus position of a laser beam, while a laser processing mechanism converges the laser beam into a predetermined focus position and performs a laser processing on a workpiece. The process control apparatus includes: a calculator that, based on the magnitude of an output of the laser beam that changes during the laser processing, calculates a change amount of a positional deviation of the focus position in an optical axis direction that changes during the laser processing at a laser beam radiation position; and a control unit that, based on the change amount of the positional deviation that has been calculated by the calculator, controls the focus position of the laser beam during the laser processing so as to resolve the positional deviation of the focus position.

6 Claims, 9 Drawing Sheets

PROCESS CONTROL APPARATUS AND LASER PROCESSING APPARATUS

TECHNICAL FIELD

The present invention relates to a process control apparatus and a laser processing apparatus by which and in which a focus position of a laser beam radiated onto a workpiece is controlled.

BACKGROUND ART

In a laser processing apparatus that radiates a laser beam onto a workpiece and performs a laser processing on the workpiece, a processing lens converges the laser beam into a predetermined focus position so that the converged laser beam is radiated onto the workpiece. In such a laser processing apparatus, when the processing lens absorbs the laser beam, the refractive index of the processing lens changes. This phenomenon is called a thermal lens effect and could be a cause that changes the focus position of the laser beam. For this reason, such a laser processing apparatus is configured so as to correct deviations of the focus position caused by a thermal lens effect by adjusting the position of the processing lens in the optical axis direction, so that the laser beam is converged into a desired focus position.

For example, a laser processing apparatus described in Patent Document 1 is configured so that a test object is placed in a position (i.e., outside a processing table) that is different from an area in which a processing procedure is performed on a workpiece, for the purpose of detecting a deviation of the focus position. Before a laser processing is started, a laser beam is radiated onto the test object, so that the deviation of the focus position is measured based on a rise in the temperature of the test object. And also, based on a measurement result, the distance between the workpiece and the processing lens is corrected before the laser processing is started.

As another example, a laser processing apparatus according to Patent Document 2 is configured so that a processing nozzle is provided with a temperature detector for the purpose of detecting a deviation of the focus position. Based on a measurement result of the temperature detector, the distance between the workpiece and the processing lens for performing a laser processing is corrected.

Patent Document 1: Japanese Patent Application Laid-open No. S63-93491
Patent Document 2: Japanese Patent Application Laid-open No. S63-93492

DISCLOSURE OF INVENTION

Problem to be Solved by the Invention

According to the former conventional technique described above, however, because the laser processing is started after the deviation of the focus position is corrected by using the test object, it is not possible to detect deviations of the focus position that occur during the laser processing in a real-time manner. For this reason, a problem remains where it is not possible to perform the laser processing while accurately correcting the deviations of the focus position.

Further, according to the latter conventional technique described above, a problem arises where the configuration of the processing nozzle is complicated. In addition, because the temperature detector is provided in a position that is away from the processing lens, it is not possible to accurately detect deviations of the focus position that occur during the laser processing. For this reason, a problem remains where it is not possible to perform the laser processing while accurately correcting the deviations of the focus position.

In view of the circumstances described above, it is an object of the present invention to obtain a process control apparatus and a laser processing apparatus with which it is possible to accurately control the focus position of a laser beam radiated onto a workpiece.

Means for Solving Problem

To solve the above problems and achieve the object, a process control apparatus that controls a focus position of a laser beam, while a laser processing apparatus converges the laser beam into a predetermined focus position and performs a laser processing on a workpiece, the process control apparatus comprising: a calculator that, based on a magnitude of an output of the laser beam that changes during the laser processing, calculates a change amount of a positional deviation of the focus position in an optical axis direction that changes during the laser processing at a laser beam radiation position; and a focus position control unit that, based on the change amount of the positional deviation that has been calculated by the calculator, controls the focus position of the laser beam during the laser processing so as to resolve the positional deviation of the focus position.

Effect of the Invention

According to an aspect of the present invention, the change amount of the positional deviation of the focus position is calculated based on the magnitude of the output of the laser beam that changes during a laser processing. Thus, an advantageous effect is achieved where it is possible to accurately control the focus position of the laser beam radiated on a workpiece.

EXPLANATIONS OF LETTERS OR NUMERALS

1 Laser oscillator
2 Mirror

3 Bend mirror
4 Beam optimizing unit
5, 6 Bend mirror
7 Processing lens
9 Workpiece
10 Processing head
11 Lens holding cylinder
13 Lens holding spacer
14 Processing nozzle
21 Setting information input unit
22 Calculator
23 Control unit
31 Thermal lens information
32 Setting information
40, 41 Driving unit
100 Laser processing apparatus
200 Process control apparatus
300 Laser processing mechanism

BEST MODE(S) FOR CARRYING OUT THE INVENTION

In the following sections, exemplary embodiments of a process control apparatus and a laser processing apparatus according to the present invention will be explained in detail based on the accompanying drawings. The present invention is not limited to the exemplary embodiments.

First Embodiment

Figure 1:
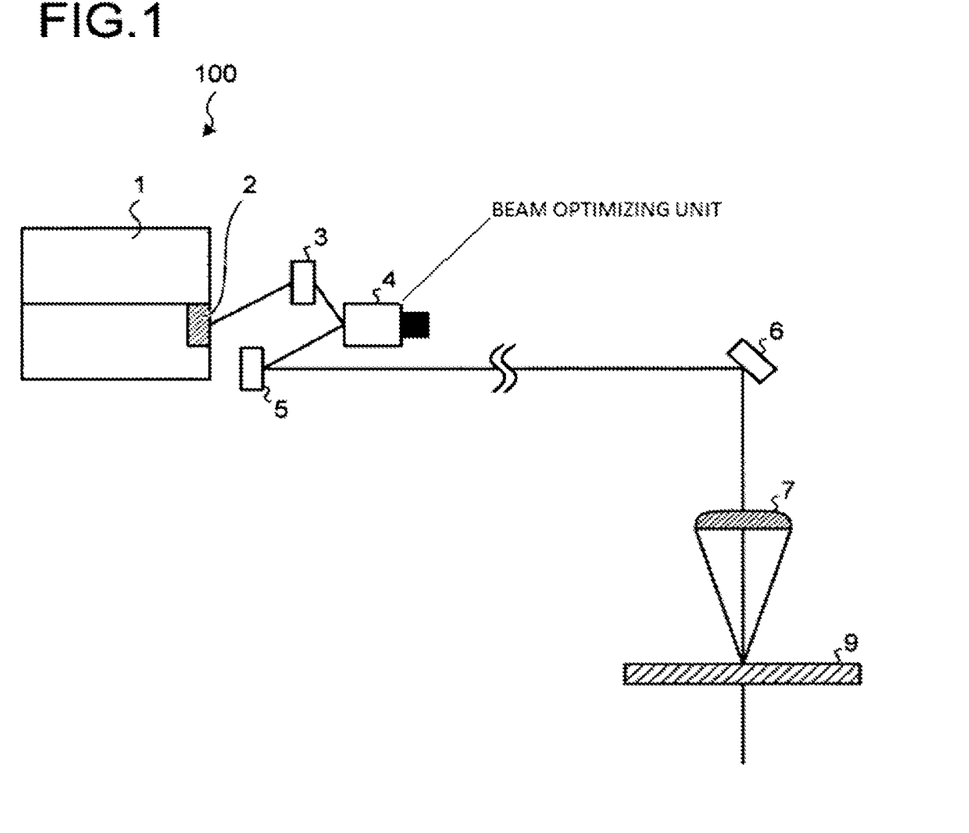
FIG. 1 is a drawing of a schematic configuration of a laser processing apparatus according to an embodiment of the present invention.

FIG. 1 is a drawing of a schematic configuration of a laser processing apparatus according to a first embodiment of the present invention. A laser processing apparatus 100 is configured so as to include a laser oscillator (i.e., a laser beam output unit) 1, a Partial Reflection (PR) mirror 2, a bend mirror 3, a beam optimizing unit 4, bend mirrors 5 and 6, and a processing lens 7.

A laser oscillator 1 is a device that causes a laser beam (i.e., beam light) such as a $CO_2$ laser to oscillate. When a laser processing is performed, the laser oscillator 1 emits a laser beam while changing a laser output variously. The PR mirror (i.e., the partial reflection mirror) 2 partially reflects the laser beam that has been emitted by the laser oscillator 1 and guides the partially-reflected laser beam to the bend mirror 3. The bend mirror (i.e., a beam angle changing mirror) 3 changes the beam angle of the laser beam that has been sent from the PR mirror 2 and guides the laser beam to the beam optimizing unit 4.

The beam optimizing unit (i.e., a beam diameter changing device) 4 adjusts the beam caliber (i.e., the diameter) of the laser beam that has been sent from the bend mirror 3 and sends the laser beam to the bend mirror 5. The bend mirrors 5 and 6 are beam angle changing mirrors. The bend mirror 5 deflects, in a horizontal direction, the beam angle of the laser beam that has been sent from the beam optimizing unit 4 and sends the deflected laser beam to the bend mirror 6. The bend mirror 6 deflects, in a vertically downward direction, the beam angle of the laser beam that has been sent from the bend mirror 5 and sends the deflected laser beam to the processing lens 7. A mirror (not shown) that applies a change to the deflected beam is installed between the bend mirror 5 and the bend mirror 6.

The processing lens 7 converges the laser beam that comes from the bend mirror 6 so as to have a small spot diameter and radiates the laser beam onto a workpiece 9. The focus position of the processing lens 7 according to the first embodiment is adjusted according to, for example, the magnitude of the power of the laser beam (i.e., a set output of the laser beam) that has been output from the laser oscillator 1. Because the set output of the laser beam changes variously during a laser processing, the laser processing apparatus 100 changes the position of the processing lens 7 variously during a laser processing, according to the set output of the laser beam. With the above described configuration, the laser processing apparatus 100 performs the laser processing on the workpiece 9, while correcting deviations of the focus position caused by a thermal lens effect. The thermal lens effect in the laser processing apparatus 100 occurs due to heat absorptions of the PR mirror 2 and the processing lens 7. For this reason, according to the first embodiment, the position of the processing lens 7 is adjusted so as to resolve the deviations of the focus position caused by the thermal lens effect of the PR mirror 2 and the processing lens 7. The workpiece 9 has been placed on a processing table (not shown) and the laser processing is performed on the workpiece 9 on the processing table.

Figure 2:
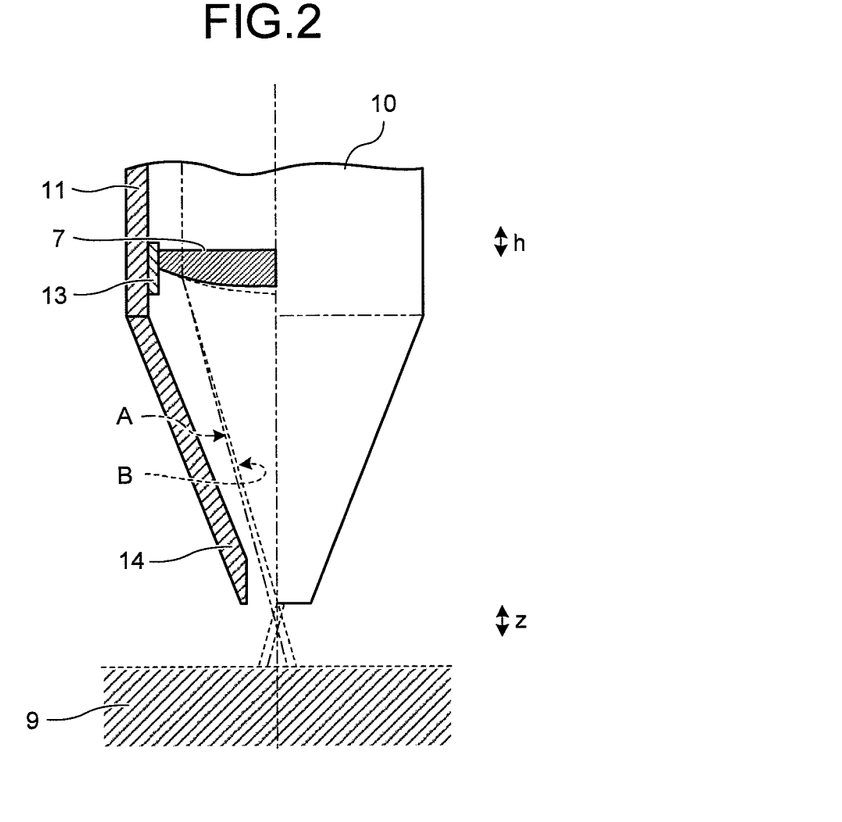
FIG. 2 is a schematic drawing of a processing head including a processing lens.

FIG. 2 is a schematic drawing of a processing head including a processing lens. A processing head 10 includes a lens holding cylinder 11, the processing lens 7, a lens holding spacer 13, and a processing nozzle 14.

The lens holding cylinder 11 is a casing that stores therein the processing lens 7 and the lens holding spacer 13. The lens holding cylinder 11 is attached to the main body of the laser processing apparatus 100 in such a manner that the optical axis coincides with the axis of the cylinder.

The processing lens 7 is substantially in the shape of a disc and is installed within the lens holding cylinder 11 in such a manner that a main surface of the processing lens 7 extends in a direction perpendicular to the optical axial direction (i.e., a focus depth direction). The processing lens 7 is installed in such a manner that the processing lens 7 is movable, within the lens holding cylinder 11, along the direction of the axis of the cylinder.

The lens holding spacer 13 is provided between the lens holding cylinder 11 and the processing lens 7 and fixes the processing lens 7 to a predetermined position within the lens holding cylinder 11. The lens holding spacer 13 is provided so as to surround the lateral face of the processing lens 7. Also, the lens holding spacer 13 abuts against the inner wall surface side of the lens holding cylinder 11 via fixing plates 16A and 16B, which are explained later. The processing nozzle 14 is provided on a lower portion side of the lens holding cylinder 11 and radiates the laser beam that has been sent via the processing lens 7 toward the workpiece 9 side.

In FIG. 2, an optical path A indicated with a dashed two-dotted line is an optical path when in normal use. An optical path B indicated with a broken line is an optical path in a situation where the thermal lens effect has occurred. When in normal use, the focus position is set in a position (i.e., a desired processing position) near a surface of the workpiece 9. In contrast, in the case where the thermal lens effect has occurred, the focus position deviates from the desired processing position. According to the first embodiment, even in the case where the thermal lens effect has occurred, the laser processing apparatus 100 corrects the focus position by moving the processing lens 7 to a position in the optical axis direction according to a deviation amount of the focus position (i.e., a focus position deviation amount z). More specifically, the laser processing apparatus 100 converges the laser beam into the focus position that is the same as the focus position in situations where the thermal lens effect has not occurred, by moving (i.e., by correcting the position of) the processing lens 7 by an amount equal to a position correction value h (i.e., an adjustment amount) having the same distance as a change amount of the focus position deviation amount z (i.e., a focus position change amount Δz). The laser processing apparatus 100 performs the laser processing on the workpiece 9, while moving the processing lens 7 by the amount equal to the position correction value h, according to the focus position change amount Δz that changes during the laser processing. The focus position change amount Δz mentioned here corresponds to the "change amount of the positional deviation" used in the claims.

Figure 3:
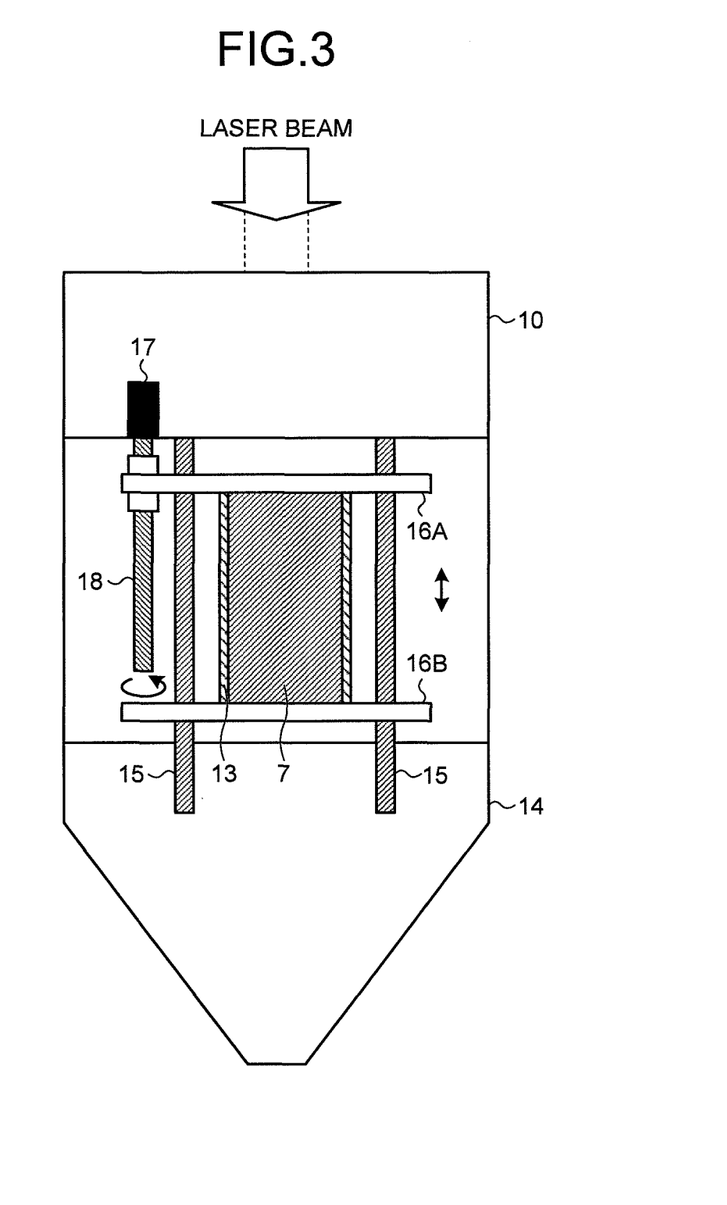
FIG. 3 is a drawing for explaining a moving operation of a processing lens within the processing head.

FIG. 3 is a drawing for explaining a moving operation of the processing lens within the processing head. As shown in FIG. 3, the processing head 10 has, on the inside thereof, guiding rods (i.e., up-and-down guiding shafts) 15. Each of the guiding rods 15 is installed within the processing head 10 so that the lengthwise direction thereof corresponds to the optical axis direction of the laser beam. In FIG. 3, an example in which two guiding rods 15 are provided is shown; however, three or more guiding rods 15 may be provided.

The upper surface side of the processing lens 7 abuts against the fixing plate 16A via the lens holding spacer 13, whereas the lower surface side of the processing lens 7 abuts against the fixing plate 16B via the lens holding spacer 13, in such a manner that the processing lens 7 is fixed by the fixing plates 16A and 16B. The fixing plate 16A is in the shape of a disc having a hole larger than the upper surface of the processing lens 7 in a part thereof corresponding to where the laser beam enters the processing lens 7, so that the entrance of the laser beam into the processing lens 7 is not blocked. The fixing plate 16B is in the shape of a disc having a hole larger than the lower surface of the processing lens 7 in a part thereof corresponding to where the laser beam exits from the processing lens 7, so that the exit of the laser beam from the processing lens 7 is not blocked.

Each of the fixing plates 16A and 16B has, in outer circumferential parts thereof, through holes having the guiding rods 15 go through therein. Each of the fixing plates 16A and 16B is configured so as to move in an up-and-down direction along the layout direction (i.e., the lengthwise direction) of the guiding rods 15. Also, each of the fixing plates 16A and 16B is engaged with threads of a ball screw 18. The ball screw 18 is rotated by a stepping motor 17. When the stepping motor 17 turns, the ball screw 18 rotates so that the fixing plates 16A and 16B move in the up-and-down direction along the guiding rods 15. With this arrangement, the processing lens 7 moves in the up-and-down direction within the processing head 10.

Figure 4:
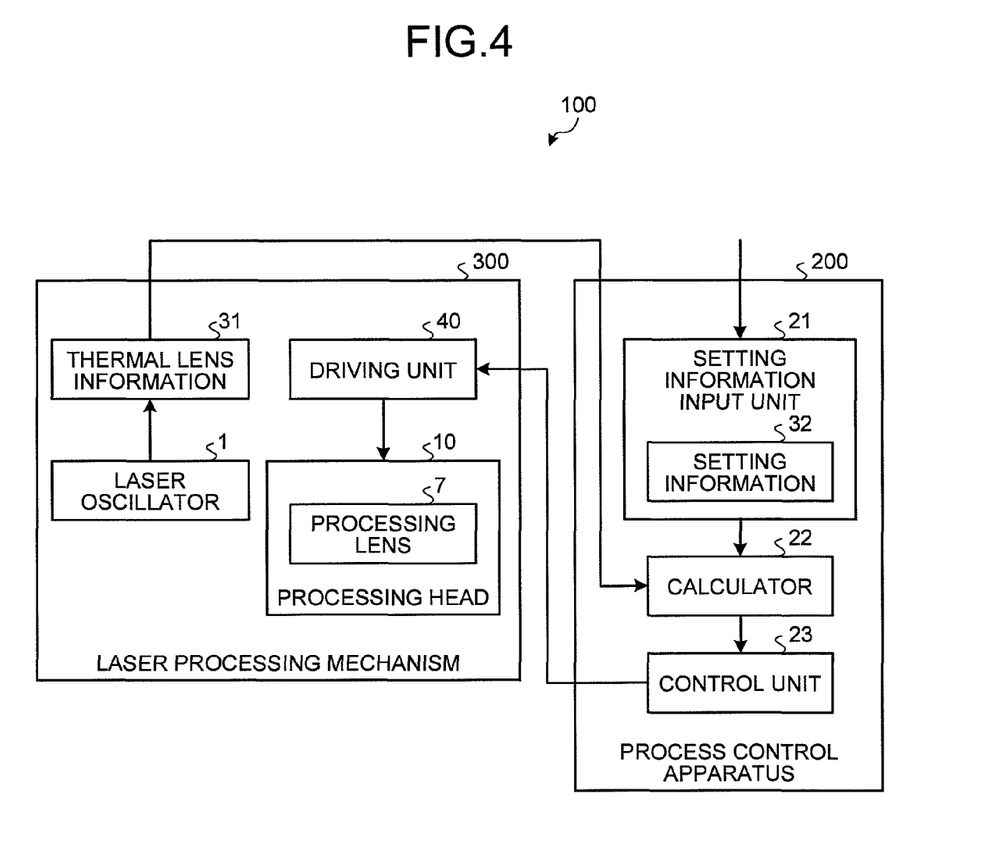
FIG. 4 is a functional block diagram of a laser processing apparatus according to a first embodiment of the present invention.

FIG. 4 is a functional block diagram of a laser processing apparatus according to the first embodiment. The laser processing apparatus 100 includes a laser processing mechanism 300 and a process control apparatus 200. The laser processing mechanism 300 is configured so as to include the laser oscillator 1, the processing head 10, and a driving unit 40. The laser processing mechanism 300 performs a laser processing on the workpiece 9 based on a command from the process control apparatus 200.

Of elements (information) that cause a thermal lens effect, the laser processing mechanism 300 sends information that is obtainable by the laser processing mechanism 300 to the process control apparatus 200, as thermal lens information 31. The thermal lens information 31 is information related to the state of the laser processing mechanism 300 when a laser processing is performed. The thermal lens information 31 includes, for example, an output of the laser beam that has been set in the laser oscillator 1 (i.e., a set output P), a focus distance f of the processing lens 7, a set value in the beam optimizing unit 4 (i.e., a beam diameter set value) (hereinafter, the "beam optimizing unit set value $D_{AO}$"). The set output P is a value that changes during a laser processing, according to a processing computer program (i.e., processing conditions). The focus distance f is a value that is determined by the type of the processing lens 7 (e.g., the diameter thereof) and is a fixed value that does not change during the laser processing. In the case where a laser processing is performed while the beam diameter of the laser beam radiated onto the workpiece 9 is being changed, the beam optimizing unit set value $D_{AO}$ is a value that changes during the laser processing. In contrast, in the case where a laser processing is performed while the beam diameter of the laser beam radiated onto the workpiece 9 is being fixed, the beam optimizing unit set value $D_{AO}$ is a fixed value that does not change during the laser processing.

The driving unit 40 adjusts the position of the processing lens 7 in the optical axis direction within the processing head 10, according to a command (i.e., a lens position correction command) for adjusting the position of the processing lens 7 that is sent from the process control apparatus 200. The driving unit 40 uses the current position of the processing lens 7 as a reference position for adjusting the position of the processing lens 7 and moves the processing lens 7 from the current position by the amount equal to the position correction value h.

The process control apparatus 200 calculates the focus position change amount Δz according to the thermal lens effect and sends the lens position correction command (i.e., the position correction value h) corresponding to the focus position change amount Δz to the laser processing mechanism 300. The process control apparatus 200 controls the position of the processing lens 7 in the optical axis direction by sending the lens position correction command to the laser processing mechanism 300.

The process control apparatus 200 includes a setting information input unit 21, a calculator 22, and a control unit (i.e., a focus position control unit) 23. The setting information input unit 21 is configured so as to include a mouse and/or a keyboard. Information related to causes of occurrence of the thermal lens effect is input by a user as setting information 32. The setting information 32 is information that changes according to a usage status and the like of the laser processing apparatus 100. For example, it is acceptable to change the setting information 32 at times desired by the user (e.g., once a month). Also, the setting information 32 is information that is input in advance before a laser processing is started and is a fixed value that does not change during the laser processing.

The setting information 32 is information related to the processing conditions and includes, for example, a heat absorption factor Aw of the processing lens 7, a heat absorption factor Ap of the PR mirror 2, a time constant τ of the focus change, and a beam diameter ω of the laser beam radiated onto the workpiece 9. It is acceptable to input the beam diameter ω through the setting information input unit 21. Alternatively, the calculator 22 may calculate the beam diameter ω. In the following sections, an example in which the calculator 22 calculates the beam diameter ω will be explained.

The heat absorption factor Aw of the processing lens 7 is set, for example, within a range from 0.16% to 0.25%. The heat absorption factor Ap of the PR mirror 2 is set, for example, within a range from 0.07% to 0.15%. The time constant τ of the focus change is a changing speed of the focus position while the focus position is being changed. The beam diameter ω is the beam diameter of the laser beam radiated onto the workpiece 9 and is calculated by using a predetermined calculation formula.

The calculator 22 calculates the focus position change amount Δz by using the setting information 32 that has been input by the setting information input unit 21 and the thermal lens information 31 that comes from the laser processing mechanism 300. The calculator 22 sends the calculated focus position change amount Δz to the control unit 23.

The calculator 22 calculates the focus position change amount Δz by using, for example, Expression (1) shown below:

$$\Delta z = (\alpha \times Aw \times P/\omega^2 - z) \times \Delta t/\tau \tag{1}$$

As shown in Expression (1), the focus position change amount Δz is dependent on the heat absorption factor Aw of the processing lens 7 and a beam intensity per unit area ($P/\omega^2$). In Expression (1), α is a constant, and $\omega^2$ is a value that is dependent on the set output P, the heat absorption factor Ap of the PR mirror 2, and the beam optimizing unit set value $D_{AO}$, and the focus distance f of the processing lens 7. Of these four elements by which $\omega^2$ is determined, a polynomial expression is used for the set output P. Thus, the user inputs these four values into the setting information input unit 21. Accordingly, the calculator 22 calculates the value of $\omega^2$, and also, calculates the focus position change amount Δz by using the calculated value of $\omega^2$.

The control unit 23 adjusts the position of the processing lens 7 in the optical axis direction, by sending the lens position correction command (i.e., the position correction value h) that corresponds to the focus position change amount Δz provided by the calculator 22, to the laser processing mechanism 300.

In the present example, the values that have been input by the user are used as the setting information 32; however, predetermined default values may be used as the setting information 32. An arrangement is acceptable in which, for example, a default value of the heat absorption factor Aw of the processing lens 7 is set to 0.12(%), whereas a default value of the heat absorption factor Ap of the PR mirror 2 is set to 0.15(%), so that these default values may be used as the heat absorption factor Aw of the processing lens 7 and the heat absorption factor Ap of the PR mirror 2, respectively. Also, it is acceptable to use a predetermined default value as the time constant τ of the focus change.

Figure 5:
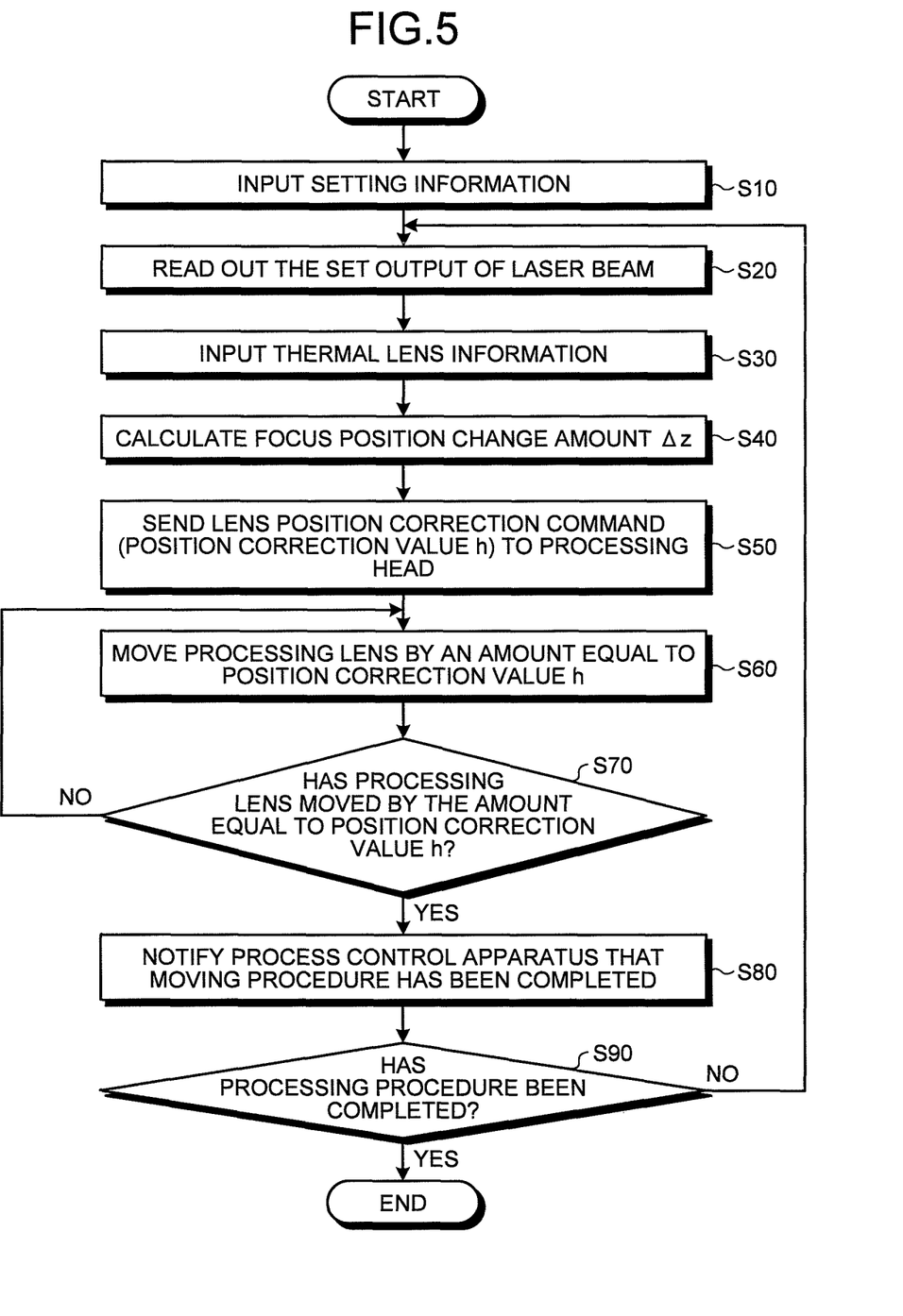
FIG. 5 is a flowchart of an operation procedure of the laser processing apparatus according to the first embodiment.

Next, an operation procedure of the laser processing apparatus 100 according to the first embodiment will be explained. FIG. 5 is a flowchart of an operation procedure of the laser processing apparatus according to the first embodiment. Before a laser processing is started, the user inputs the setting information 32 by using the setting information input unit 21 (step S10). The setting information 32 is input to the calculator 22 from the setting information input unit 21.

Also, based on the processing head 10 attached to the laser processing apparatus 100, the focus distance f is determined. For example, an information table indicating a correspondence relationship between the processing head 10 and the focus distance f is stored in the laser processing apparatus 100, so that the laser processing apparatus 100 extracts the focus distance f that corresponds to the processing head 10 by referring to the information table. Also, the beam optimizing unit set value $D_{AO}$ is set in the beam optimizing unit 4 by the user.

When the laser processing has been started, the set output P is read out from the processing computer program or the like, as a current laser output of the laser beam emitted from the laser oscillator 1 (step S20). Subsequently, current thermal lens information 31 including the set output P, the focus distance f, and the beam optimizing unit set value $D_{AO}$ is input to the calculator 22 from the laser processing mechanism 300 (step S30).

An arrangement is acceptable in which the laser processing mechanism 300 inputs the focus distance f to the calculator 22 only the first time after the processing procedure is started. In that situation, only when the thermal lens information 31 is input to the calculator 22 for the first time after the laser processing is started, the focus distance f is included in the thermal lens information 31. It means that the focus distance f is not included in the thermal lens information 31 that is input to the calculator 22 the second and following times after the processing procedure is started.

Another arrangement is acceptable in which, in the case where the beam optimizing unit set value $D_{AO}$ does not change during the processing procedure, the laser processing mechanism 300 inputs the beam optimizing unit set value $D_{AO}$ to the calculator 22 only the first time after the processing procedure is started. In that situation, only when the thermal lens information 31 is input to the calculator 22 for the first time after the laser processing is started, the beam optimizing unit set value $D_{AO}$ is included in the thermal lens information 31. It means that the beam optimizing unit set value $D_{AO}$ is not included in the thermal lens information 31 that is input to the calculator 22 the second and following times after the processing procedure is started.

In contrast, in the case where the beam optimizing unit set value $D_{AO}$ changes during the processing procedure, the laser processing mechanism 300 makes an arrangement so that each of all the pieces of thermal lens information 31 that are input to the calculator 22 includes a beam optimizing unit set value $D_{AO}$ and a set output P. In that situation, the beam optimizing unit set value $D_{AO}$ is read out from the processing computer program and put into each of the pieces of thermal lens information 31.

The calculator 22 calculates a focus position change amount Δz by using the setting information 32 and the thermal lens information 31 (step S40) and sends the calculation result to the control unit 23. The control unit 23 sends a lens position correction command (i.e., a position correction value h) used for moving the processing lens 7 by a distance corresponding to the focus position change amount Δz, to the laser processing mechanism 300 (i.e., the processing head 10) (step S50). The lens position correction command is sent to the driving unit 40 included in the laser processing mechanism 300.

The driving unit 40 moves the processing lens 7 by the amount equal to the position correction value h from the current position of the processing lens 7 (step S60). More specifically, in the case where the focus position deviation amount z at an n'th time (where n is a natural number) is expressed as Zn, whereas the focus position deviation amount z at an (n+1)'th time is expressed as Z(n+1), the processing lens 7 is moved by the amount expressed as (Z(n+1)–Zn) =Δz=h in the (n+1)'th focus position correction procedure.

The driving unit 40 checks to see whether the processing lens 7 has been moved by the amount equal to the position correction value h (step S70). In the case where the processing lens 7 has not been moved by the amount equal to the position correction value h (step S70: No), the driving unit 40 repeats the procedures of steps S60 and S70. In the case where the processing lens 7 has been moved by the amount equal to the position correction value h (step S70: Yes), the driving unit 40 notifies the process control apparatus 200 that the moving procedure has been completed (step S80). After that, if the laser processing has not been completed (step S90: No), the laser processing apparatus 100 repeats the procedures of steps S20 through S90 until the laser processing is completed.

Figure 6:
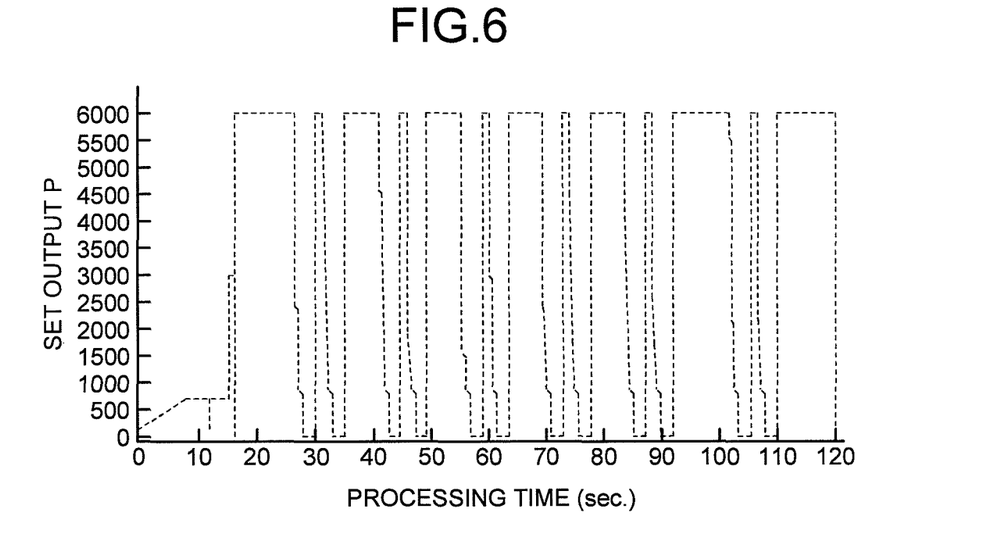
FIG. 6 is a chart for explaining an example of changes in a set output of a laser beam during a processing procedure.

FIG. 6 is a chart for explaining an example of changes in the set output P of a laser beam during a processing procedure.

Figure 7:
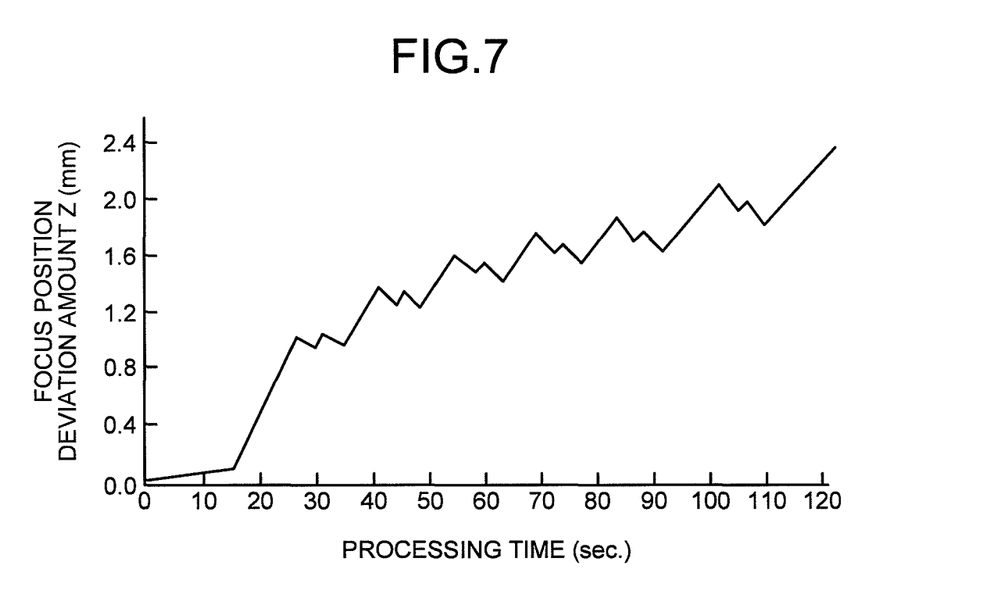
FIG. 7 is a chart for explaining an example of changes in a focus position deviation amount during a processing procedure.

FIG. 7 is a chart for explaining an example of changes in the focus position deviation amount during a processing procedure. In the chart shown in FIG. 6, the vertical axis expresses the set output P (watts), whereas the horizontal axis expresses a processing time (seconds). In the chart shown in FIG. 7, the vertical axis expresses the focus position deviation amount z (millimeters), whereas the horizontal axis expresses a processing time (seconds). The focus position deviation amount z illustrated in FIG. 7 changes according to the set output P illustrated in FIG. 6.

As depicted in FIG. 6, the set output P of the laser processing apparatus 100 is set variously so that the emission of the laser beam is repeatedly turned on and off. In addition, the focus position deviation amount z changes along with the changes in the set output P. In other words, by calculating the focus position change amount Δz during the laser processing, the laser processing apparatus 100 is able to obtain, as a result, history of the focus position deviation amount z illustrated in FIG. 7. According to the first embodiment, by moving the processing lens 7 so as to resolve the focus position deviation amount z, the deviations of the focus position caused by the thermal lens effect are corrected. With the above described configuration, it is possible to converge the laser beam into a desired focus position without using the processing lens 7 or the PR mirror 2 of which the heat absorption factor is close to 0. Accordingly, it is possible to perform the laser processing on the workpiece 9 at a low cost.

In the first embodiment, the example has been explained in which the focus position change amount Δz is calculated while the laser processing is being performed so that the position of the processing lens 7 may be corrected; however, another arrangement is acceptable in which the focus position change amount Δz is calculated, in advance, for each processing time, based on the processing program, the thermal lens information 31, the setting information 32, and the like, before the laser processing is started.

As explained above, according to the first embodiment, because the position of the processing lens 7 in the optical axis direction is controlled based on the set output P and the like, it is possible to accurately resolve the deviations of the focus position occurring during the laser processing. As a result, by using the simple configuration, it is possible to perform a laser processing having a high level of precision with respect to shapes.

Second Embodiment

Figure 9:
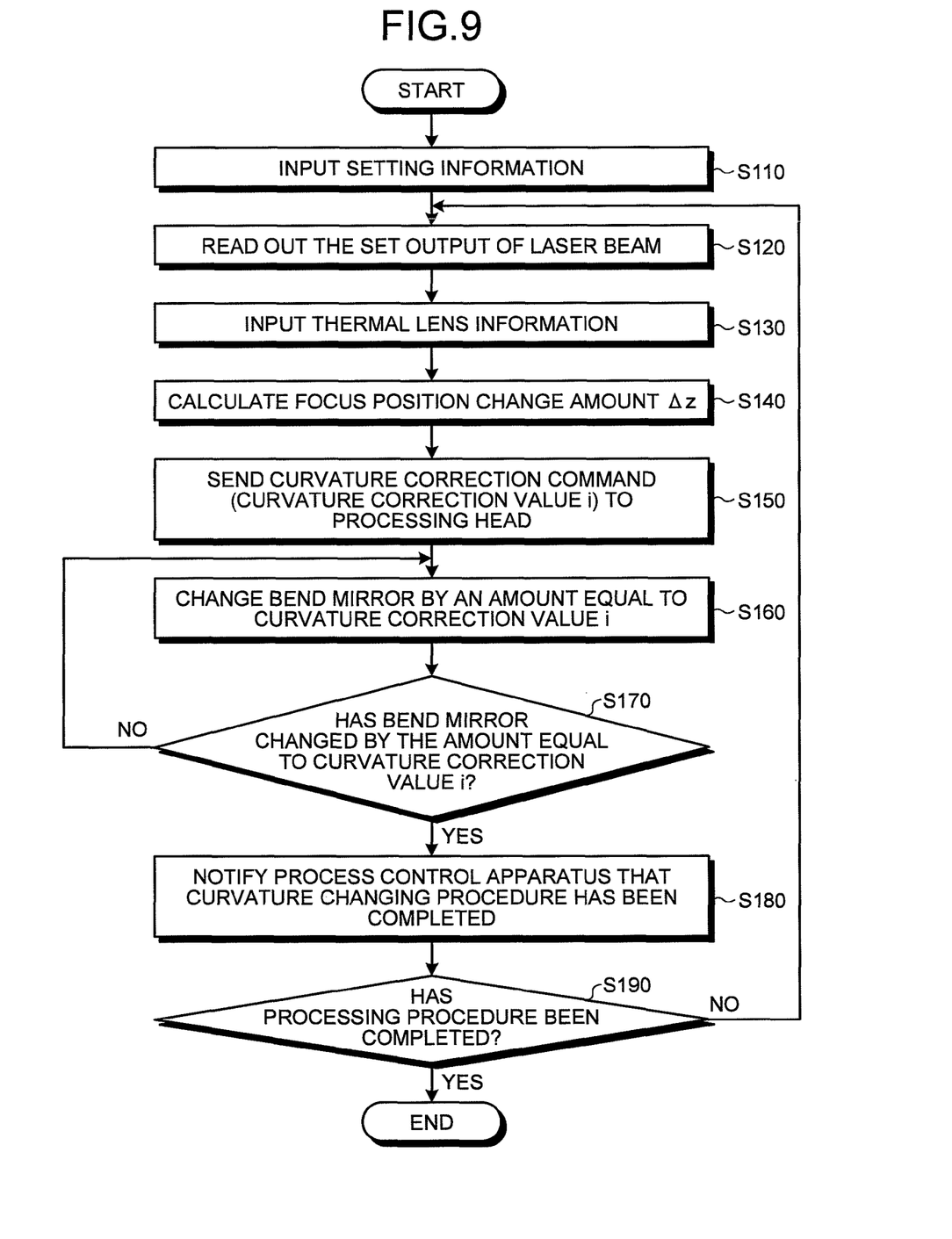
FIG. 9 is a flowchart of an operation procedure of the laser processing apparatus according to the second embodiment.
Figure 10:
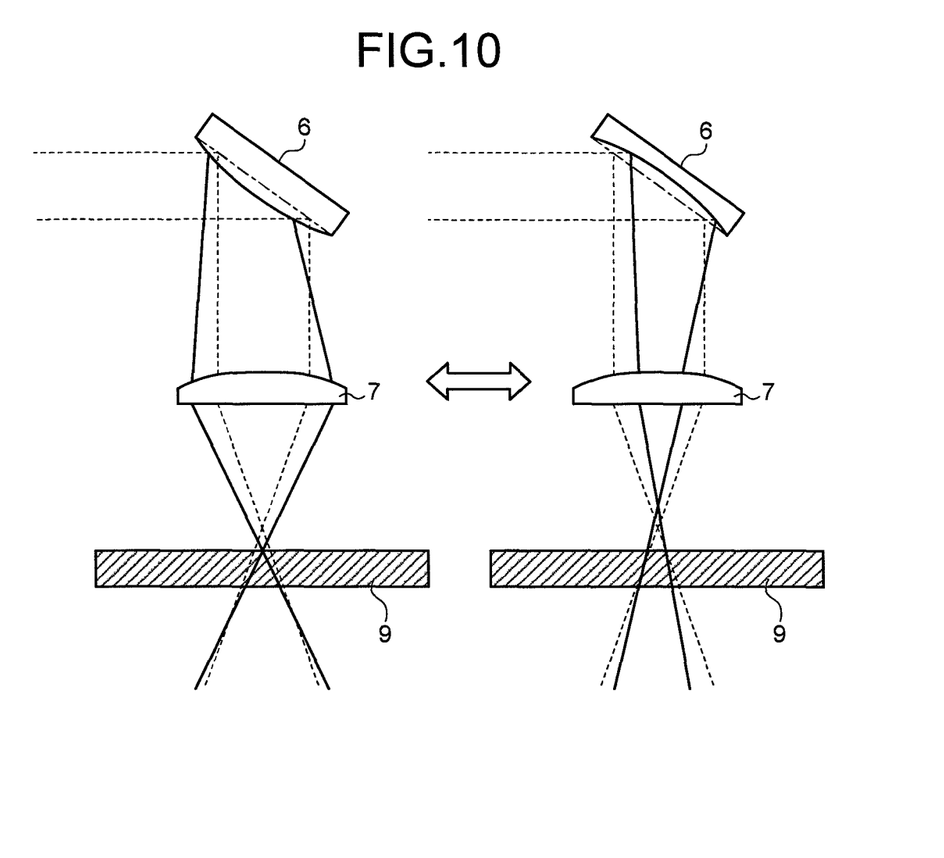
FIG. 10 is a drawing for explaining a relationship between changes in a curvature of a bend mirror and changes of a focus position.

Next, a second embodiment of the present invention will be explained, with reference to FIGS. 8 to 10. According to the second embodiment, the bend mirror 6 controls the focus position based on the set output P and the like. More specifically, a curvature of the bend mirror 6 according to the second embodiment is adjusted according to, for example, the magnitude of the power of the laser beam that is output from the laser oscillator 1. Because the set output of the laser beam changes variously during a laser processing, the laser processing apparatus 100 changes the curvature of the bend mirror 6 variously during the laser processing, according to the set output of the laser beam. With the above described configuration, the laser processing apparatus 100 performs the laser processing on the workpiece 9, while correcting deviations of the focus position caused by the thermal lens effect. The thermal lens effect in the laser processing apparatus 100 occurs due to heat absorptions of the PR mirror 2 and the processing lens 7. For this reason, according to the second embodiment, the curvature of the bend mirror 6 is controlled (i.e., adjusted) so as to resolve the deviations of the focus position caused by the thermal lens effect of the PR mirror 2 and the processing lens 7. In the following sections, a functional configuration and an operation procedure of a laser processing apparatus according to the second embodiment will be explained.

Figure 8:
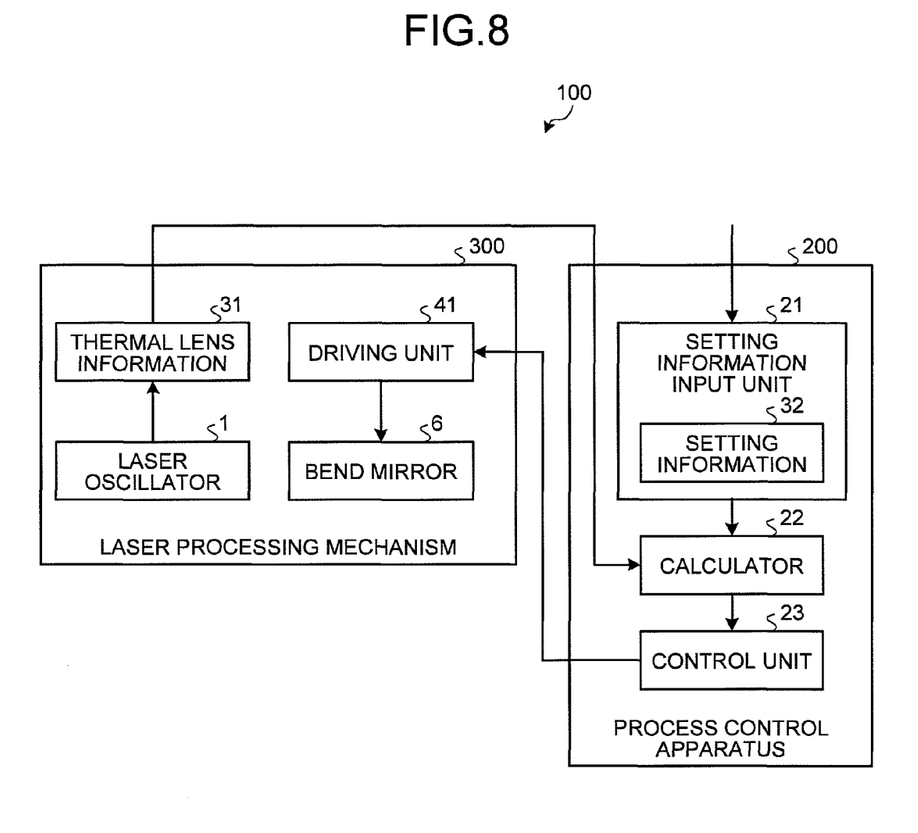
FIG. 8 is a functional block diagram of a laser processing apparatus according to a second embodiment of the present invention.

FIG. 8 is a functional block diagram of the laser processing apparatus according to the second embodiment. Some of the constituent elements illustrated in FIG. 8 that achieve the same functions as those included in the laser processing apparatus 100 according to the first embodiment illustrated in FIG. 4 are referred to by using the same reference numbers, and the duplicate explanation thereof will be omitted. The laser processing apparatus 100 includes the laser processing mechanism 300 and the process control apparatus 200. The laser processing mechanism 300 is configured so as to include the laser oscillator 1, the bend mirror 6, and the driving unit 40. The laser processing mechanism 300 performs a laser processing on a workpiece 9 based on a command that is sent from the process control apparatus 200.

A driving unit 41 adjusts the curvature of the bend mirror 6, according to a command (i.e., a curvature correction command) for adjusting the curvature of the bend mirror 6 that is sent from the process control apparatus 200. The driving unit 41 uses the current curvature of the bend mirror 6 as a reference position for adjusting the curvature of the bend mirror 6 and changes the curvature of the bend mirror 6 from the current curvature by an amount equal to a curvature correction value i.

The process control apparatus 200 calculates the focus position change amount Δz according to the thermal lens effect and sends the curvature correction command (i.e., the curvature correction value i), which corresponds to the focus position change amount Δz, to the laser processing mechanism 300. The process control apparatus 200 according to the second embodiment controls the curvature of the bend mirror 6 by sending the curvature correction command to the laser processing mechanism 300. More specifically, the control unit 23 adjusts the curvature of the bend mirror 6, by sending the curvature correction command (i.e., the curvature correction value i) that corresponds to the focus position change amount Δz provided by the calculator 22 to the laser processing mechanism 300 and thus corrects the focus position of the laser beam converged on the workpiece 9.

Next, an exemplary configuration of the bend mirror 6 (i.e., a curvature-changeable reflection mirror) of which the curvature is changeable will be explained. The bend mirror 6 according to the second embodiment is configured so as to include: a laser beam reflecting member of which the curvature is changeable by a fluid pressure of air, water, or the like; a reflecting member supporting unit; a fluid supplying unit; a means for changing a fluid supply pressure in a step-by-step manner or in a continuous manner; and a fluid discharging unit.

The laser beam reflecting member is provided in the optical path of the laser beam and may be elastically deformed by the fluid pressure. The reflecting member supporting unit supports a circumferential part of the laser beam reflecting member and forms, together with the laser beam reflecting member, a space on the side opposite to a laser beam reflecting surface. The fluid supplying unit supplies the fluid into the space formed by the reflecting member supporting unit. The fluid discharging unit discharges the fluid out of the space formed by the reflecting member supporting unit.

The bend mirror 6 is configured so that the space formed by the laser beam reflecting member and the reflecting member supporting unit has a hermetically sealed structure, except for a fluid supply path and a fluid discharge path. The fluid pressure that is required to elastically deform the laser beam reflecting member is applied to the side opposite of the laser beam reflecting surface. In accordance with change of the fluid pressure, the surface of the laser beam reflecting member included in the bend mirror 6 deforms so as to have a convex surface or a concave surface and so that the curvature thereof changes.

Next, an operation procedure of the laser processing apparatus 100 according to the second embodiment will be explained. FIG. 9 is a flowchart of an operation procedure of the laser processing apparatus according to the second embodiment. In the following sections, some of the procedures for performing the same operations as those performed by the laser processing apparatus 100 according to the first embodiment explained with reference to FIG. 5 will be omitted from the explanation.

Up to the procedure for calculating the focus position change amount Δz, the laser processing apparatus 100 performs the same procedures as performed by the laser processing apparatus 100 according to the first embodiment. The procedures at steps S110 through S140 illustrated in FIG. 9 correspond to the procedures at steps S10 through S40 illustrated in FIG. 5.

The calculator 22 sends a focus position change amount Δz (i.e., a calculation result) that has been calculated by using the setting information 32 and the thermal lens information 31 (i.e., the set output P and the like) to the control unit 23. The control unit 23 sends a curvature correction command (i.e., a curvature correction value i) used for moving the bend mirror 6 by a curvature corresponding to the focus position change amount Δz, to the laser processing mechanism 300 (step S150). The curvature correction command is sent to the driving unit 41 included in the laser processing mechanism 300.

The driving unit 41 changes the curvature of the bend mirror 6 by the amount equal to the curvature correction value i from the current curvature of the bend mirror 6 (step S160). More specifically, in the case where the focus position deviation amount z at an m'th time (where m is a natural number) is expressed as Zm, whereas the focus position deviation amount z at an (m+1)'th time is expressed as Z(m+1), the curvature of the bend mirror 6 is changed so that the focus position changes by the amount expressed as (Z(m+1)−Zm) in the (m+1)'th focus position correction procedure.

The driving unit 41 checks to see whether the curvature of the bend mirror 6 has been changed by the amount equal to the curvature correction value i (step S170). In the case where the curvature of the bend mirror 6 has not been changed by the amount equal to the curvature correction value i (step S170: No), the driving unit 41 repeats the procedures of steps S160 and S170. In the case where the curvature of the bend mirror 6 has been changed by the amount equal to the curvature correction value i (step S170: Yes), the driving unit 41 notifies the process control apparatus 200 that the curvature changing procedure has been completed (step S180).

Next, a relationship between the changes in the curvature of the bend mirror 6 and the changes of the focus position will be explained. FIG. 10 is a drawing for explaining a relationship between the changes in the curvature of the bend mirror and the changes of the focus position. The left half of FIG. 10 corresponds to a situation where the bend mirror 6 has a convex surface, whereas the right half of FIG. 10 corresponds to a situation where the bend mirror 6 has a concave surface.

A laser beam that is radiated onto the workpiece 9 via the bend mirror 6 having the convex surface has a longer focus position than that in a situation where a parallel-ray laser beam is radiated onto the workpiece 9. A laser beam that is radiated onto the workpiece 9 via the bend mirror 6 having the concave surface has a shorter focus position than that in a situation where a parallel-ray laser beam is radiated onto the workpiece 9.

As explained above, according to the second embodiment, by changing the curvature of the bend mirror 6, it is possible to change the focus position of the laser beam radiated onto the workpiece 9, like in the example in which the position of the processing lens 7 is changed.

After the driving unit 41 notifies the process control apparatus 200 that the curvature changing procedure has been completed, if the laser processing has not been completed (step S190: No), the laser processing apparatus 100 repeats the procedures of steps S120 through S190 until the laser processing is completed.

As explained above, according to the second embodiment, because the curvature of the bend mirror 6 is controlled based on the set output P and the like, it is possible to accurately resolve the deviations of the focus position occurring during the laser processing. As a result, by using the simple configuration, it is possible to perform a laser processing having a high level of precision with respect to shapes.

INDUSTRIAL APPLICABILITY

As described above, the process control apparatus and the laser processing apparatus according to an aspect of the present invention are suitable for controlling the focus position of the laser beam radiated onto a workpiece.

The invention claimed is:

1. A process control apparatus that controls a focus position of a laser beam, while a laser processing apparatus converges the laser beam into a predetermined focus position by using a processing lens and performs a laser processing on a workpiece, the process control apparatus comprising:
   a calculator that, based on a magnitude of an output of the laser beam that changes during the laser processing, calculates a change amount of a positional deviation of the focus position in an optical axis direction that changes during the laser processing at a laser beam radiation position; and
   a focus position control unit that, based on the change amount of the positional deviation that has been calculated by the calculator, controls the focus position of the laser beam during the laser processing so as to resolve the positional deviation of the focus position wherein
   the calculator calculates a beam intensity of the laser beam per unit area by using the magnitude of the output of the laser beam and a diameter of the laser beam, and
   the calculator calculates the change amount of the positional deviation by using the beam intensity per unit area that has been calculated and a heat absorption factor of the processing lens that is input from an external source.

2. The process control apparatus as set forth in claim 1 wherein the focus position control unit controls the focus position of the laser beam according to a set output power of the laser beam.

3. The process control apparatus as set forth in claim 1 wherein the external source is a setting information input unit configured to receive input information relating to the laser processing conditions.

4. The process control apparatus as set forth in claim 3 wherein the input information includes information specifying the heat absorption factor of the processing lens, a time constant of the positional deviation, and the diameter of the laser beam.

5. The process control apparatus as set forth in claim 4 further configured to receive processing information which includes a set output power of the laser beam and a focus distance.

6. The process control apparatus as set forth in claim 5 wherein the calculator calculates the change amount of the positional deviation based on the input information and the processing information.

* * * * *